United States Patent
Su

(10) Patent No.: US 10,184,467 B2
(45) Date of Patent: Jan. 22, 2019

(54) NON-BEAM PUMPING UNIT DRIVEN BY A BIAXIAL MOTOR

(71) Applicant: Zhishen Su, Heilongjiang (CN)

(72) Inventor: Zhishen Su, Heilongjiang (CN)

(73) Assignee: Daqing Dannuo Petroleum Technology Development Co, Ltd., Ranghu Dist., Daqing, Heilongjiang (CN)

( * ) Notice: Subject to any disclaimer, the term of this patent is extended or adjusted under 35 U.S.C. 154(b) by 0 days.

(21) Appl. No.: 15/657,240

(22) Filed: Jul. 24, 2017

(65) Prior Publication Data
US 2018/0163715 A1    Jun. 14, 2018

(30) Foreign Application Priority Data
Dec. 14, 2016  (CN) ............. 2016 2 1367301 U

(51) Int. Cl.
| | |
|---|---|
| F16H 1/14 | (2006.01) |
| F16H 1/20 | (2006.01) |
| F04B 47/04 | (2006.01) |
| F04D 25/06 | (2006.01) |
| F04D 29/049 | (2006.01) |
| F04B 47/14 | (2006.01) |
| F04B 47/02 | (2006.01) |
| F04F 1/20 | (2006.01) |
| H02N 2/14 | (2006.01) |
| H02N 2/12 | (2006.01) |

(52) U.S. Cl.
CPC .............. *F04B 47/04* (2013.01); *F04B 47/02* (2013.01); *F04B 47/14* (2013.01); *F04B 47/145* (2013.01); *F04D 25/0606* (2013.01); *F04D 29/049* (2013.01); *F04F 1/20* (2013.01); *H02N 2/126* (2013.01); *H02N 2/147* (2013.01)

(58) Field of Classification Search
CPC ...... F04D 25/06; F04D 25/606; F04D 29/049; E21B 43/126; F04B 47/02; F04B 47/04; F04B 47/145; F04F 1/20; H02N 2/126; H02N 2/147
USPC ............................................................ 74/41
See application file for complete search history.

(56) References Cited

U.S. PATENT DOCUMENTS

| | | | | |
|---|---|---|---|---|
| 3,782,117 A | * | 1/1974 | James ............... | F04B 47/04 417/904 |
| 4,299,545 A | * | 11/1981 | Bever ............... | F04B 47/04 417/390 |
| 2009/0266186 A1 | * | 10/2009 | Gu ............... | E21B 43/126 74/41 |

* cited by examiner

*Primary Examiner* — Jake Cook

(57) ABSTRACT

The non-beam pumping unit driven by a biaxial comprises a base, a tower body and a drive mechanism. The drive mechanism is mounted on the platform, comprising a biaxial motor, a large roller, a small roller, a belt and a counterweight device. The two ends of the biaxial motor are respectively connected with the two ends of the large roller through the chain and the sprocket respectively. The utility uses the biaxial motor instead of the uniaxial motor which in the prior art, the motor and the large roller on both sides are in balance, and solves the problem of partial grinding effectively and prolongs the service life of the bearing.

3 Claims, 3 Drawing Sheets

NON-BEAM PUMPING UNIT DRIVEN BY A BIAXIAL MOTOR

BACKGROUND OF THE INVENTION

1. Field of the Invention

The utility model belongs to the field of the non-beam pumping unit, specifically relating to a non-beam pumping unit driven by a biaxial motor.

2. Description of the Related Art

In the petroleum exploitation, the pumping unit is one of the most commonly used oil extraction equipment and most of the pumping units used in the prior art are beam pumping units. There are problems like low mechanical transmission efficiency, high power consumption, difficulty in maintenance and high fault rate in beam pumping units due to their physical structures. To solve these problems, researchers have developed a non-beam pumping unit. The existing non-beam pumping unit typically comprises a base, a tower body mounted on the base and a drive mechanism mounted on a platform at the top of the tower body. The drive mechanism comprises a motor, a roller, a belt and a counterweight device and two ends of the belt are connected with a beam hanger and the counterweight device of the pumping unit respectively. The belt is wrapped around the roller from the upper side of the roller. The motor drives the roller to rotate through the chain so that the beam hanger at both ends of the belt and the counterweight device are moved up and down through driving by the belt, thus achieving the oil pumping of the pumping unit.

In the prior art, the motors used in the non-beam pumping unit are ordinary permanent magnet motors. The motor has only one power output, and the power can be transmitted only on one side of the motor and the roller. The large roller is in a state of continuous heavy load operation, resulting in a large difference force between on both sides of the motor and the roller, and then produced partial wear and bearing damage and other issues.

SUMMARY OF THE INVENTION

The utility model provides a non-beam pumping unit driven by a motor reduction unit to solve the problems proposed in the above-mentioned background art.

The utility model solves the technical problems by adopting the following technical solutions:

A non-beam pumping unit driven by a biaxial motor, comprising a base, a tower body and a drive mechanism, wherein the base is fixedly mounted on the ground; the lower end of the tower body is hinged on the base, and a pull rod is connected between the tower body and the base and both ends of the pull rod are respectively hinged on the tower body and the base, and the hinge point between the tower body and the base and two end points of the pull rod constitute a triangular supporting structure and the upper end of the tower body is provided with a platform; the drive mechanism is mounted on the platform, comprising a motor reduction unit, a large roller, a small roller, a belt and a counterweight device; The two ends of the biaxial motor are connected to the ends of the large roller by means of a chain and a sprocket respectively, and one end of the belt is connected to the beam hanger and the other end is suspended from the upper side by a large roller and a small roller, then connected to the counterweight device, the pull rod is connected to the tower body by means of a hinge support, and the hinged support on the tower body has three, the three hinged supports are arranged at equal intervals along the length of the tower body, and the bolts are provided at a joint between the bottom of the tower body and one end of the base, the bolts connect the bottom of the tower body to the base.

The pull rod is provided with a length adjusting screw. The tower body is provided with an angle incidence indicator.

The utility model has the following beneficial effects:

1. The utility model uses the biaxial motor instead of the uniaxial motor which in the prior art, the biaxial motor and the large roller on both sides are in balance, and solves the problem of partial grinding effectively and prolongs the service life of the bearing.

2. The tower body is hinged to the base and when take the workover the support of the pull rod can be removed and turn the tower body to a horizontal position to create more space for the workover operation.

3. The pull rod is provided with a length adjusting screw and the angle of inclination of the tower body can be finely adjusted with the length adjusting screw. The angle incidence indicator is used to indicate the angle of inclination of the tower body. The length adjusting screw is rotated while the angle of inclination is viewed to effectively improve the adjustment speed.

DETAILED DESCRIPTION OF THE PREFERRED EMBODIMENTS

Figure 1:
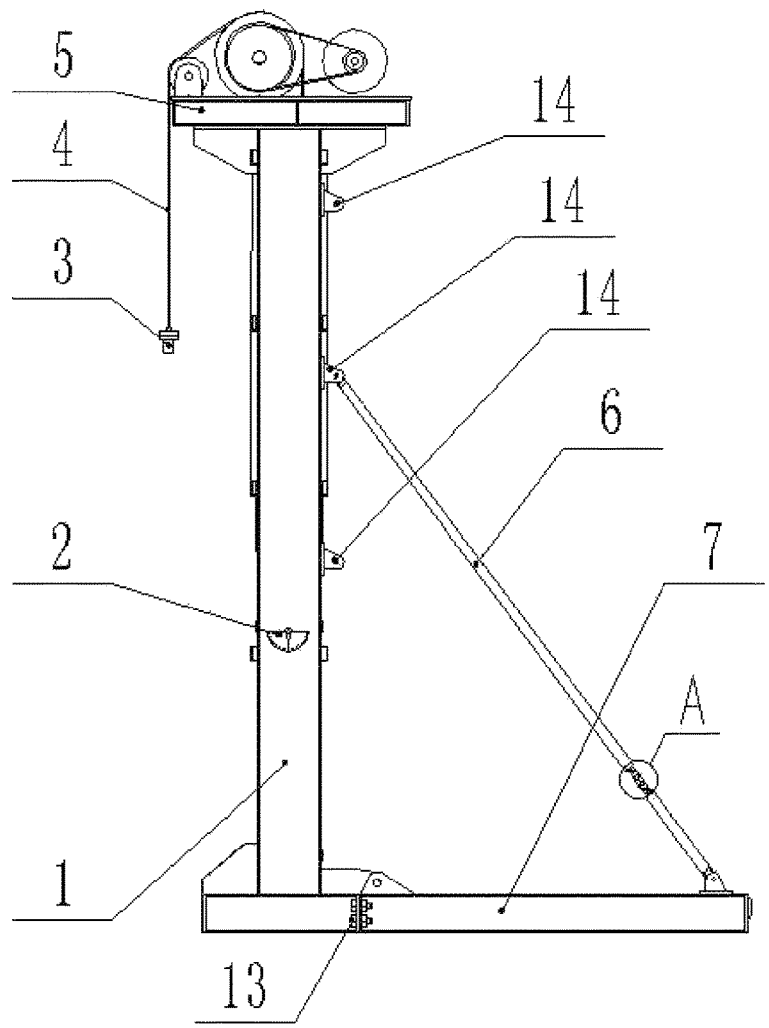
FIG. 1 is a structural schematic diagram of the utility model.
Figure 2:
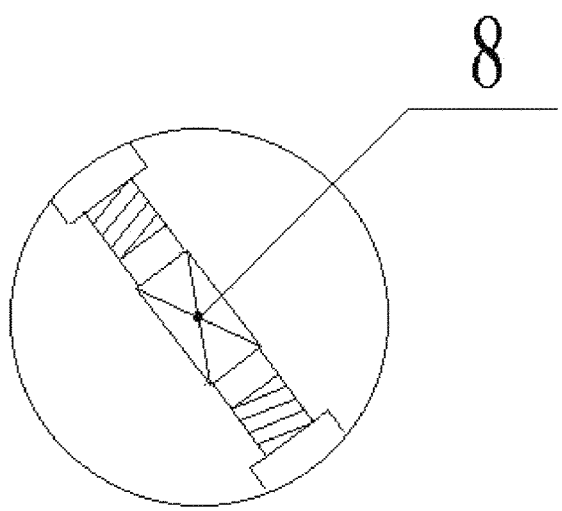
FIG. 2 is a partial enlarged view of part A in FIG. 1.
Figure 3:
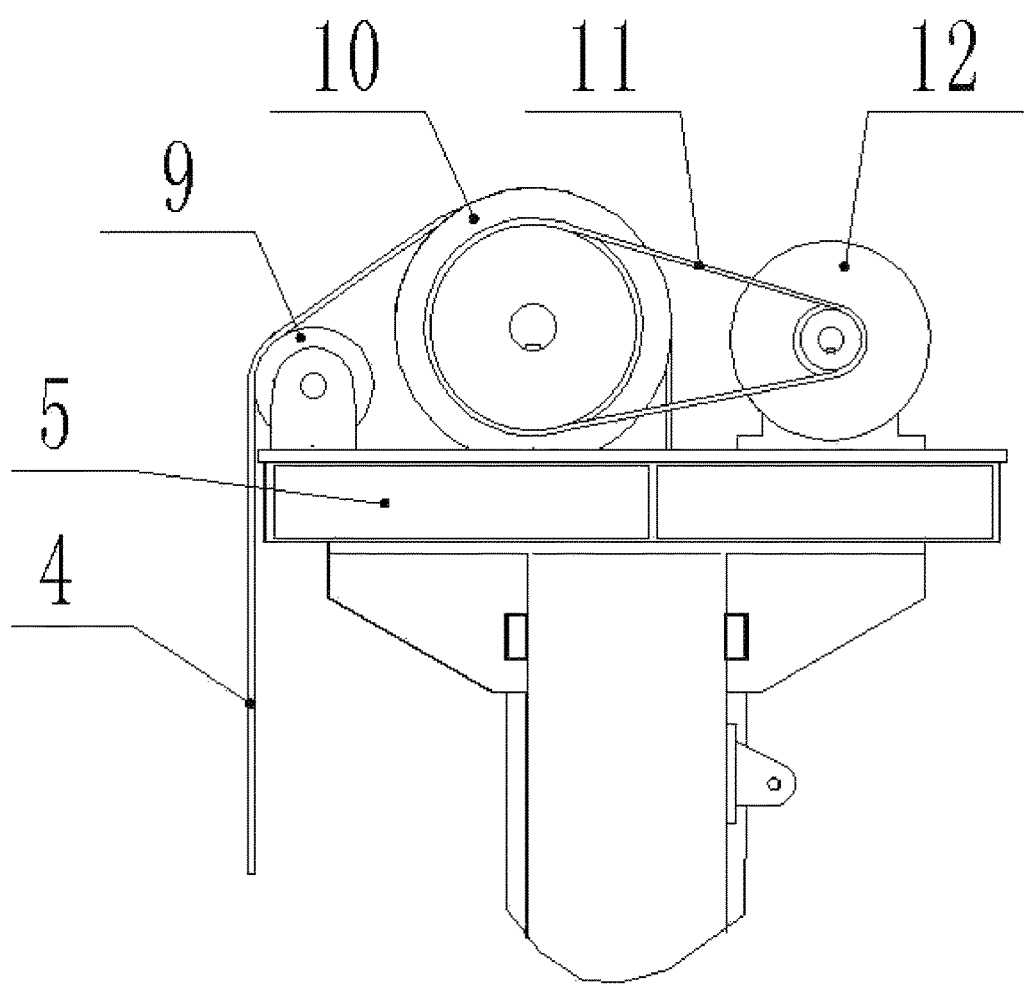
FIG. 3 is a top view of the drive mechanism.
Figure 4:
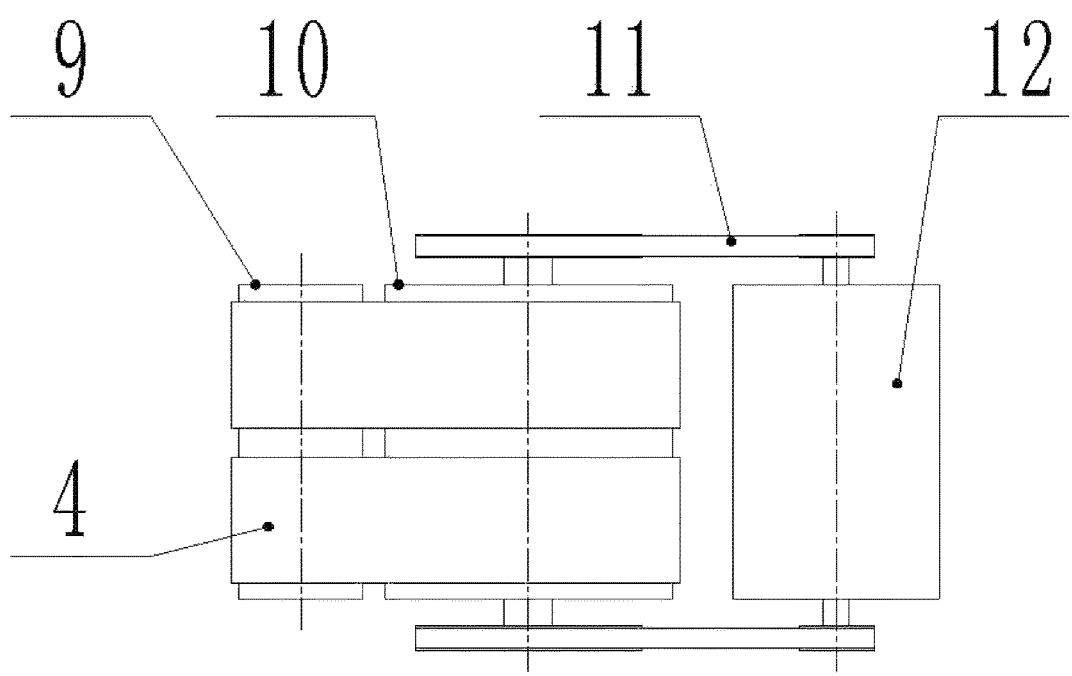
FIG. 4 is the structure schematic of the drive mechanism.
In figures: 1—tower body, 2—angle incidence indicator, 3—beam hanger, 4—belt, 5—platform, 6—pull rod, 7—base, 8—length adjusting screw, 9—small roller, 10—large roller, 11—chain, 12—biaxial motor, 13—bolt, 14—hinged support.

The utility model is further described as follows with reference to the drawings: According to the embodiment, the non-beam pumping unit driven by a biaxial motor comprises: a base 7, a tower body 1 and a drive mechanism, wherein the base 7 is fixedly mounted on the ground; the lower end of the tower body 1 is hinged on the base 7, and when take the workover the support of the pull rod can be removed and turn the tower body to a horizontal position to create more space for the workover operation.

The pull rod 6 is connected between the tower body 1 and the base 7 and both ends of the pull rod 6 are respectively hinged on the tower body 1 and the base 7, and the hinge point between the tower body 1 and the base 7 and two end points of the pull rod 6 constitute a triangular supporting structure and the upper end of the tower body 1 is provided with a platform 5; the drive mechanism is mounted on the platform 5, comprising a motor reduction unit, a large roller 10, a small roller 9, a belt 4 and a counterweight device Using the biaxial motor 12 instead of the uniaxial motor which in the prior art, the biaxial motor 12 and the large roller 10 on both sides are in balance, and solves the problem of partial grinding effectively and prolongs the service life of the bearing.

The pull rod 6 is connected to the tower body 1 by means of a hinge support 14, and the hinged support 14 on the tower body 1 has three, the three hinged supports 14 are arranged at equal intervals along the length of the tower body 1. When the pumping unit is in normal operation, the pull rod 6 is connected to the hinged supports 14 located at the middle and needs to be tilted at a small angle to the tower body 1. The pull rod 6 can be connected to the hinge supports 14 located on the uppermost side of the tower body 1. The bolts 13 are provided at a joint between the bottom of the tower body 1 and one end of the base 7, the bolts 13 connect the bottom of the tower body 1 to the base 7. When the tower body 1 is erected, if only supported by the pull rod 6, the pumping unit can operate normally, but the vibration and noise during operation are relatively large. The installation of the bolt 13 can be applied to the tower body 1 to further lock, and thus reducing noise and vibration.

The pull rod 6 is provided with a length adjusting screw 8. The tower body 1 is provided with an angle incidence indicator 2. The inclination angle of the tower body 1 is adjusted by the length adjustment screw 8, and the inclination angle of the inclination angle indicator 2 is used to indicate the inclination angle of the tower body 1. When the length adjustment screw 8 is rotated, the inclination angle is viewed and the adjustment speed can be effectively increased.

What is claimed is:

1. A non-beam pumping unit driven by a biaxial motor, comprising a base (7), a tower body (1) and a drive mechanism, wherein the base (7) is fixedly mounted on the ground; the lower end of the tower body (1) is hinged on the base (7), and a pull rod (6) is connected between the tower body (1) and the base (7) and both ends of the pull rod (6) are respectively hinged on the tower body (1) and the base (7), and the hinge point between the tower body (1) and the base (7) and two end points of the pull rod (6) constitute a triangular supporting structure and the upper end of the tower body (1) is provided with a platform (5); the drive mechanism is mounted on the platform (5), the drive mechanism comprising a motor reduction unit, a large roller (10), a small roller (9), a belt (4); two ends of the biaxial motor (12) are connected to ends of the large roller (10) by means of a chain (11) respectively, and one end of the belt (4) is connected to a beam hanger (3) and the other end is suspended from the upper side by a large roller (10) and a small roller (9), the number of the rollers is two, which contain a large roller and a small roller, the pull rod (6) is connected to the tower body (1) by means of a hinge support (14), there are three hinged supports (14)on the tower body (1), the number of the hinged supports is three, the three hinged supports (14) are arranged at equal intervals along the length of the tower body (1), and bolts (13) are provided at a joint between the bottom of the tower body (1) and one end of the base (7), the bolts (13) connect the bottom of the tower body (1) to the base (7).

2. The non-beam pumping unit driven by a biaxial motor according to claim 1, wherein the pull rod (6) is provided with a length adjusting screw (8).

3. The non-beam pumping unit driven by a biaxial motor according to claim 1, wherein the tower body (1) is provided with an angle incidence indicator (2).

* * * * *